United States Patent
Bodner et al.

(10) Patent No.: US 9,773,572 B2
(45) Date of Patent: Sep. 26, 2017

(54) PRESSURE-TUBE REACTOR WITH PRESSURIZED MODERATOR

(75) Inventors: Robert Bodner, Mississauga (CA); Jonathan Tyo, Mississauga (CA); Dan Popov, Mississauga (CA); Sermet Kuran, Mississauga (CA)

(73) Assignee: Atomic Energy of Canada Limited, Chalk River (CA)

( * ) Notice: Subject to any disclaimer, the term of this patent is extended or adjusted under 35 U.S.C. 154(b) by 589 days.

(21) Appl. No.: 13/641,627

(22) PCT Filed: Apr. 21, 2011

(86) PCT No.: PCT/CA2011/000459
§ 371 (c)(1),
(2), (4) Date: Jan. 31, 2013

(87) PCT Pub. No.: WO2011/130841
PCT Pub. Date: Oct. 27, 2011

(65) Prior Publication Data
US 2013/0121452 A1    May 16, 2013

Related U.S. Application Data

(60) Provisional application No. 61/327,502, filed on Apr. 23, 2010.

(51) Int. Cl.
*G21C 1/08* (2006.01)
*G21C 5/02* (2006.01)
(Continued)

(52) U.S. Cl.
CPC .............. *G21C 1/086* (2013.01); *G21C 1/10* (2013.01); *G21C 5/02* (2013.01); *G21C 19/19* (2013.01); *G21C 15/02* (2013.01); *Y02E 30/40* (2013.01)

(58) Field of Classification Search
CPC .......... G21C 19/19; G21C 1/086; G21C 1/20; G21C 5/02
(Continued)

(56) References Cited

U.S. PATENT DOCUMENTS 3,053,746 A * 9/1962 Challender et al. .......... 376/260
3,071,527 A   1/1963 Young
(Continued)

FOREIGN PATENT DOCUMENTS

CA    2174983         10/1997
DE    3215122 C1      11/1983
(Continued)

OTHER PUBLICATIONS

Peiman, Wargha; Kamiel Gabriel; and Igor Pioro. "Thermal design options of new pressure channel for SCWRs." 17th International Conference on Nuclear Engineering. American Society of Mechanical Engineers, 2009. Full reference attached. Abstract available online: <http://proceedings.asmedigitalcollection.asme.org/proceeding.aspx?articleid=1629677>.*

(Continued)

*Primary Examiner* — Jack W Keith
*Assistant Examiner* — Lily C Garner
(74) *Attorney, Agent, or Firm* — Bereskin & Parr LLP/S.E.N.C.R.L., s.r.l.

(57) ABSTRACT

A nuclear reactor can include a pressure vessel for containing a pressurized moderator at a first pressure. The nuclear reactor can also include a plurality of fuel channels for a coolant fluid at a second pressure. The plurality of fuel channels are fluidly connected at inlet ends thereof to a coolant supply conduit and are adapted to receive nuclear fuel bundles and to be mounted within the pressure vessel and surrounded by the moderator. The outlet ends of the fuel channels are fluidly connected to a coolant outlet conduit to (Continued)

enable the coolant fluid to circulate from the coolant supply conduit through the fuel channels to the coolant outlet conduit. The plurality of fuel channels maintain separation between the coolant fluid circulating within the fuel channels and the moderator.

24 Claims, 7 Drawing Sheets

(51) Int. Cl.
  *G21C 19/19* (2006.01)
  *G21C 1/10* (2006.01)
  *G21C 15/02* (2006.01)
(58) Field of Classification Search
  USPC .................................................. 376/267, 366
  See application file for complete search history.

(56) References Cited

U.S. PATENT DOCUMENTS

| | | | |
|---|---|---|---|
| 3,128,234 A | 4/1964 | Cafe, Jr. et al. | |
| 3,179,571 A | 4/1965 | Schabert et al. | |
| 3,240,678 A | 3/1966 | Hemmerle et al. | |
| 3,318,777 A | 5/1967 | Kervenoael et al. | |
| 3,342,689 A * | 9/1967 | Gaudez et al. | G21C 1/20 376/307 |
| 3,350,273 A | 10/1967 | Van Der Laken | |
| 3,365,370 A | 1/1968 | Helbling | |
| 3,453,178 A | 7/1969 | Winkler et al. | |
| 3,801,443 A | 4/1974 | Yasukawa et al. | |
| 4,046,627 A | 9/1977 | Middleton | |
| 4,056,440 A | 11/1977 | Macbeth | |
| 4,094,737 A | 6/1978 | Greischel et al. | |
| 4,259,993 A | 4/1981 | Scholz | |
| 4,305,458 A | 12/1981 | Jogand | |
| 4,726,926 A | 2/1988 | Patterson et al. | |
| 4,795,608 A | 1/1989 | Nylund | |
| 4,826,653 A | 5/1989 | Nylund et al. | |
| 4,842,804 A | 6/1989 | Hopkins | |
| 4,911,880 A | 3/1990 | Kasai et al. | |
| 5,154,880 A | 10/1992 | Oosterkamp | |
| 5,640,434 A | 6/1997 | Rottenberg | |
| 5,892,806 A | 4/1999 | Scott | |
| 6,053,652 A | 4/2000 | Deaver et al. | |
| 6,236,701 B1 | 5/2001 | Nylund | |
| 6,526,115 B2 | 2/2003 | Kataoka et al. | |
| 2013/0089174 A1 | 4/2013 | Diamond et al. | |
| 2015/0155059 A1 | 6/2015 | Yetisir et al. | |
| 2015/0155060 A1 | 6/2015 | Yetisir et al. | |
| 2015/0206604 A1 | 7/2015 | Pencer et al. | |

FOREIGN PATENT DOCUMENTS

| | | |
|---|---|---|
| EP | 0282600 | 1/1992 |
| EP | 0798745 | 10/1997 |
| GB | 803701 | 10/1958 |
| GB | 820579 | 9/1959 |
| GB | 820579 A * | 9/1959 |
| GB | 820579 A * | 9/1959 |
| JP | 63309894 | 12/1988 |
| JP | 1083187 | 3/1989 |
| JP | 2010197 | 1/1990 |
| WO | 9741565 | 11/1997 |

OTHER PUBLICATIONS

ACR-700. AECL Technical Description, ACR-700 Technical Outline. Rev. 3, 2004. Accession No. ML041350424. full version publicly available online <https://adamswebsearch2.nrc.gov/webSearch2/main.jsp?AccessionNumber=ML041350424>.*
International Preliminary Report on Patentability issued on Oct. 23, 2013 by the International Bureau of WIPO.
International Search Report issued on International Application No. PCT/CA2013/050446 mailed on Sep. 3, 2013.
Yetisir et al, Development and Integration of Canadian SCWR Concept With Counter-Flow Fuel Assembly. The 6th International Symposium on Supercritical Water-Cooled Reactors, ISSCWR-6, Mar. 7, 2013, Shenzhen, Guangdong, China.
Zhao et al, Code Design Study of a Supercritical Light Water Reactor with Double Row Fuel Rods. The 3rd China-Canada Joint Workshop on Supercritical-Water-Cooled Reactors, Apr. 18-20, 2012, Xi'an, China.
Roshd et al, Nuclear Fuel Bundle Design with Reduced Void Effect. ANS Transactions 26, 1997, pp. 603-604.
Chow et al, Conceptual Fuel Channel Designs for CANDU-SCWR. Nuclear Engineering and Technology, 2007, pp. 139-146, vol. 40, No. 2.
International Search Report issued on International Application No. PCT/CA2011/000165 mailed on May 18, 2011.
Buongiorno et al, Study of Solid Moderators for the Thermal-Spectrum Supercritical Water-Cooled Reactor. Nuclear Technology, Mar. 2006, pp. 282-303, vol. 153.
Canada's Nuclear Science and Technology Journal: Special Issue on Small Reactors, Dec. 2012, vol. 1, No. 2.
Yetisir et al, SuperSafe Reactor@ (SSR): A Supercritical Water-Cooled Small Reactor. 2nd International Technical Meeting on Small Reactors, Nov. 7-9, 2012, Ottawa, Ontario, Canada.
Pencer et al. Axial and Radial Graded Enrichment Options for the Canadian SCWR. The 3rd China-Canada Joint Workshop on Supercritical-Water-Cooled Reactors, CCSC-2012, Apr. 18-20, 2012, Xi'an, China.
Lamarsh and Baratta Introcuction to Nuclear Engineering, 3rd edition, 2001, pp. 163-168.
International Preliminary Report on Patentability issued on PCT/CA2011/000165 on Oct. 23, 2012 by the International Bureau of WIPO.
International Preliminary Report on Patentability issued on PCT/CA2013/050449 on Dec. 16, 2014 by the International Bureau of WIPO.
International Search Report issued on International Application No. PCT/CA2013/050449 mailed on Aug. 29, 2013.
International Preliminary Report on Patentability issued on PCT/CA2013/050446 on Dec. 16, 2014 by the International Bureau of WIPO.
International Preliminary Report on Patentability issued on PCT/CA2013/050447 on Dec. 16, 2014 by the International Bureau of WIPO.
International Search Report issued on International Application No. PCT/CA2013/050447 mailed on Sep. 3, 2013.
Spinks, N.J., "CANDU Nuclear Power Reactors," Thermopedia, Feb. 8, 2011, DOI: 10.1615/AtoZ.ccandu_nuclear_power_reactors.
Supplementary European Search Report issued on corresponding European application No. 13803986.2 on Feb. 3, 2016 by European Patent Office.
Supplementary European Search Report issued on corresponding European application No. 13803781.7 on Feb. 5, 2016 by European Patent Office.
Supplementary European Search Report issued on corresponding European application No. 13804526.5 on Feb. 24, 2016 by European Patent Office.
Extended European Search Report, issued in the related European patent application No. 11771446.9 on Dec. 15, 2016.
Non-Final Rejection issued Mar. 24, 2017 in respect of U.S. Appl. No. 14/420,999.
Hofmeister et al., "Fuel assembly design study for a reactor with supercritical water", Nuclear Engineering and Design, Germany, 2007.
Morky et al., "Development of supercritical water heat-transfer correlation for vertical bare tubes", Nuclear Engineering and Design, 2010.
Dimitrov, "ACR Fuel Channel Design", Atomic Energy of Canada Limited, 2002.

* cited by examiner

PRESSURE-TUBE REACTOR WITH PRESSURIZED MODERATOR

This application is a National Stage of International Application No. PCT/CA2011/000459, filed Apr. 21, 2011, which claims the benefit of Provisional Application No. 61/327,502 filed Apr. 23, 2010, each of those applications being incorporated herein in their entirety by reference.

FIELD

This invention relates to nuclear reactors, and more particularly to nuclear reactors having a pressure vessel to contain a pressurized moderator and separate pressurized coolant flowing through pressure tubes.

INTRODUCTION

Commercial nuclear power plants are known. Based on the mechanical design of the pressure retaining components of the reactor core, commercial nuclear reactors can be grouped as either "pressure-vessel" or "pressure-tube" type reactors.

Examples of a pressure-vessel type reactor are Pressurized Water Reactors (PWR) and Boiling Water Reactors (BWR). In these reactor designs nuclear fuel is contained in a large pressure vessel. In such pressure-vessel type reactors the coolant and the moderator fluid may be the same fluid and thus there is no need to maintain two different fluids separated from one another within the pressure vessel. The single fluid can be supplied to the pressure vessel using an inlet plenum and withdrawn from the vessel using an outlet plenum. In such designs there is no need to isolate a coolant fluid from a separate or different moderator fluid, consequently the plenums need not feed a plurality of separate, sealed fuel channels. The shared moderator/coolant fluid in such reactors is typically light water ($H_2O$).

In one example, referred to as Pressurized Heavy Water Reactors (PHWR), a low pressure heavy water moderator surrounds the fuel channels and a separate pressurized flow of heavy water coolant is circulated through the fuel channels. Examples of this type of reactor can be operated using natural uranium fuel. In these examples, the term "Pressurized Heavy Water" refers to the coolant in the fuel channels, not the separate heavy water moderator.

In another example, a low pressure heavy water moderator fluid surrounds the fuel channels and a separate pressurized flow of light water coolant is circulated through the fuel channels. This type of reactor can be operated using enriched uranium fuel.

Traditional, horizontal pressure-tube nuclear reactors are known. Existing pressure-tube reactors include a plurality of individual fuel channels or pressure tubes extending horizontally through a low pressure calandria vessel containing a heavy water moderator. Nuclear fuel bundles are placed within the pressure tubes and a coolant fluid is circulated through the pressure tubes to be heated by the nuclear reactions.

Coolant feeder pipes (coolant inlet pipes and coolant outlet pipes) in existing pressure-tube reactors are an integral part of the circulating heat transport system, connecting the in-reactor fuel channels with the primary heat transport pipes. The low pressure calandria vessel commonly has separate calandria tubes, to define the space for the moderator, and the pressure tubes extend through the calandria tubes. Garter springs maintain spacing between each pair of a calandria tube and a pressure tube, and define an annulus.

A typical pressure-tube design can include a plurality of fuel channels and twice as many feeder pipes (each tube having a corresponding inlet and outlet feeder).

A feature of some existing pressure-tube designs is the on-line fuelling capability. The use of separate feeders allows on-line fuelling through a removable end channel seal closure and a remotely operated fuelling machine.

Existing reactor designs, both of the pressure-vessel and pressure-tube type, cannot readily be adapted for use with a supercritical fluid, e.g. water, as the coolant and heat transfer medium. For a supercritical fluid, this specification and the present invention propose a configuration of pressure tubes, suitable for use with such a fluid. To reach a supercritical state, the coolant fluid will be maintained at high pressures (for example at pressures greater than 23 MPa) and at elevated temperatures. Existing pressure tube and pressure-vessel type designs cannot withstand such high pressures, and existing pressure tube and pressure vessel materials can be prone to increased corrosion and wear when exposed to supercritical fluids. Simply increasing the size or thickness of existing pressure tubes and pressure vessels may not be possible due to manufacturing limitations or tube spacing requirements and may affect reactor efficiency.

Creating pressure vessels for existing reactor designs to withstand high pressures and correspondingly high temperatures can be costly and difficult, and exposure to supercritical fluid flows can erode exposed portions of the pressure vessel walls, which may lead to increased maintenance and premature failure.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

According to one broad aspect of the invention, a nuclear reactor comprising includes a pressure vessel for containing a pressurized moderator at a first pressure. The nuclear reactor also includes a plurality of fuel channels for a coolant fluid at a second pressure. The plurality of fuel channels are fluidly connected at inlet ends thereof to a coolant supply conduit and are adapted to receive nuclear fuel bundles and to be mounted within the pressure vessel and surrounded by the moderator. The outlet ends of the fuel channels are fluidly connected to a coolant outlet conduit to enable the coolant fluid to circulate from the coolant supply conduit through the fuel channels to the coolant outlet conduit. The plurality of fuel channels maintain separation between the coolant fluid circulating within the fuel channels and the moderator.

According to another broad aspect, a method of operating a nuclear reactor includes the steps of a) providing a pressure vessel containing a pressurized moderator; b) providing a plurality of fuel channels extending through the pressure vessel, surrounded by the moderator; c) placing at least one nuclear fuel bundle within each fuel channel; d) circulating a coolant fluid through each fuel channel to be heated by the nuclear fuel bundle contained therein, the coolant fluid being separate from the moderator; and e) extracting the coolant fluid from each outer conduit, without direct mixing the coolant fluid with the moderator and channeling the coolant fluid for further processing.

According to another broad aspect, a method of batch-refueling a nuclear reactor includes the steps of a) providing a pressure vessel to contain a pressurized moderator and providing a plurality of outer conduits surrounded by the moderator; b) providing a first core module detachably coupled to the pressure vessel, the first core module comprising a plurality of first fuel bundles suspended within outer conduits; c) detaching the entire core module from the pressure vessel to simultaneously extract the plurality of first fuel bundles; d) providing a second core module comprising a plurality second fuel bundles; and e) coupling the second core module to the pressure vessel so that the plurality of second fuel bundles are simultaneously received within corresponding ones of the plurality of outer conduits.

According to another broad aspect, a nuclear reactor includes a pressure vessel defining a chamber for a moderator and a fueling tubesheet within the pressure vessel separating the moderator chamber from a plenum chamber for a coolant fluid. The nuclear reactor also includes an outlet plenum for the coolant fluid within the plenum chamber. An inlet plenum is defined between the outlet plenum and the plenum chamber. The plenum chamber has at least one coolant outlet port extending through the pressure vessel to an exterior of the pressure vessel. The nuclear reactor also includes a plurality of closed ended pressure tubes mounted to the fueling tubesheet and extending into the moderator. The nuclear reactor also includes a plurality of fuel liners mounted to the outlet plenum, for receiving fuel bundles. The coolant fluid can flow from the inlet plenum through the pressure tubes to the closed ends thereof, and through the fuel liners to the outlet plenum. The moderator is maintained at a first pressure and the coolant fluid is maintained at a second higher pressure. The fueling tubesheet and the pressure tubes maintaining the difference between the first and second pressures.

DRAWINGS

For a better understanding of the pressure-tube reactor with separate pressurized moderator described herein and to show more clearly how they may be carried into effect, reference will now be made, by way of example only, to the accompanying drawings which show at least one exemplary embodiment, and in which.

Figure 1:
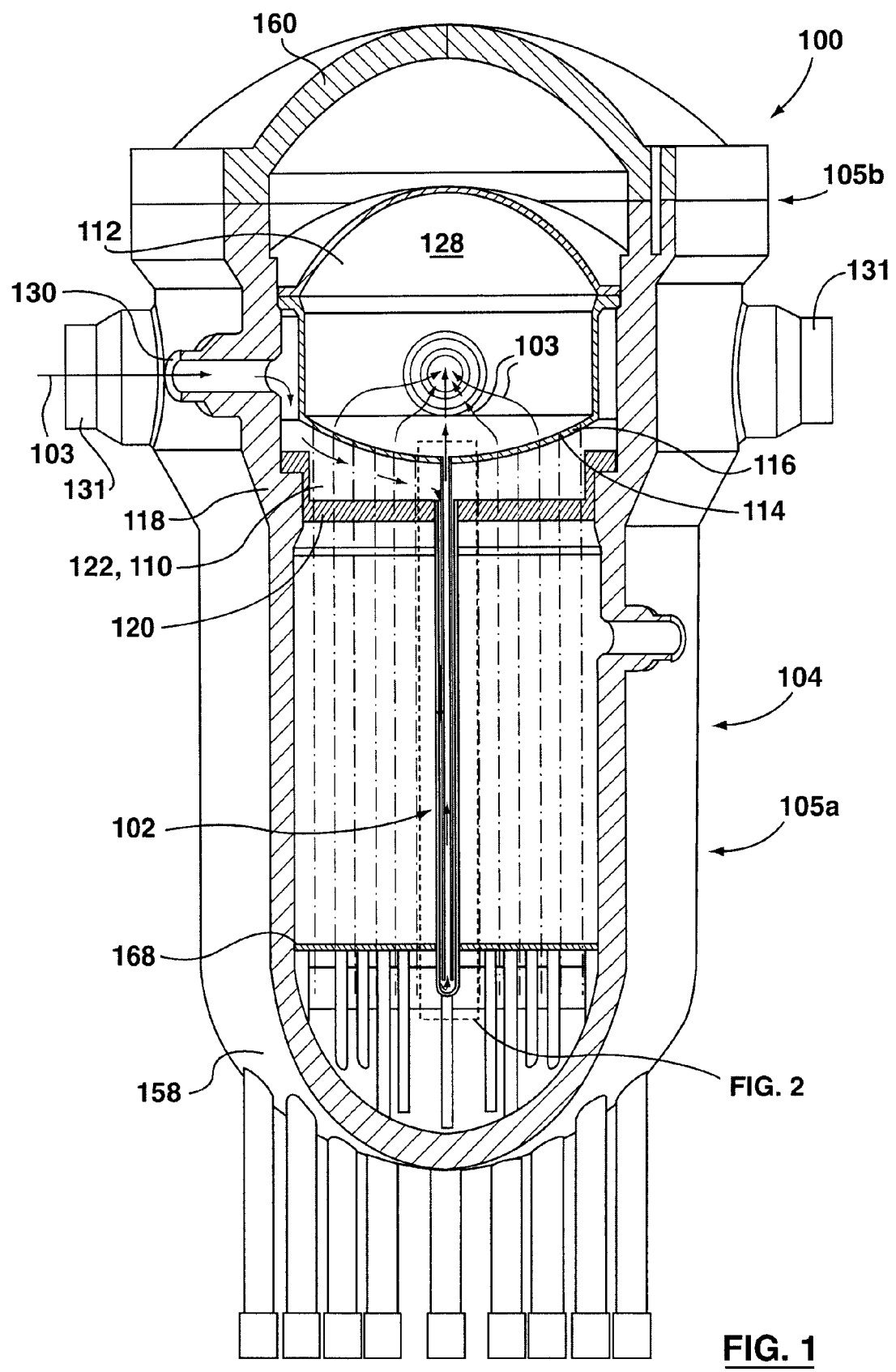
FIG. 1 is a partial sectional, front plan view of an example of a nuclear reactor.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

This specification generally describes a nuclear reactor that includes a plurality of pressurized fuel channels surrounded by a pressurized moderator. The reactor includes a pressure vessel for containing the pressurized moderator and a plurality of sealed pressure tubes for containing a flow of pressurized coolant, maintaining a separation between the coolant and the moderator fluids. An inlet plenum provides coolant to each of the fuel channels and an outlet plenum collects the heated coolant at the outlet of each fuel channel. The coolant fluid can be light water or heavy water or any other suitable coolant fluid known in the art. In some examples the coolant is in a supercritical condition as it exits the fuel channels. It is to be understood that the present invention may be generally applicable to any reactor having both a pressurized moderator (a pressure vessel) and separate coolant.

Figure 2A:
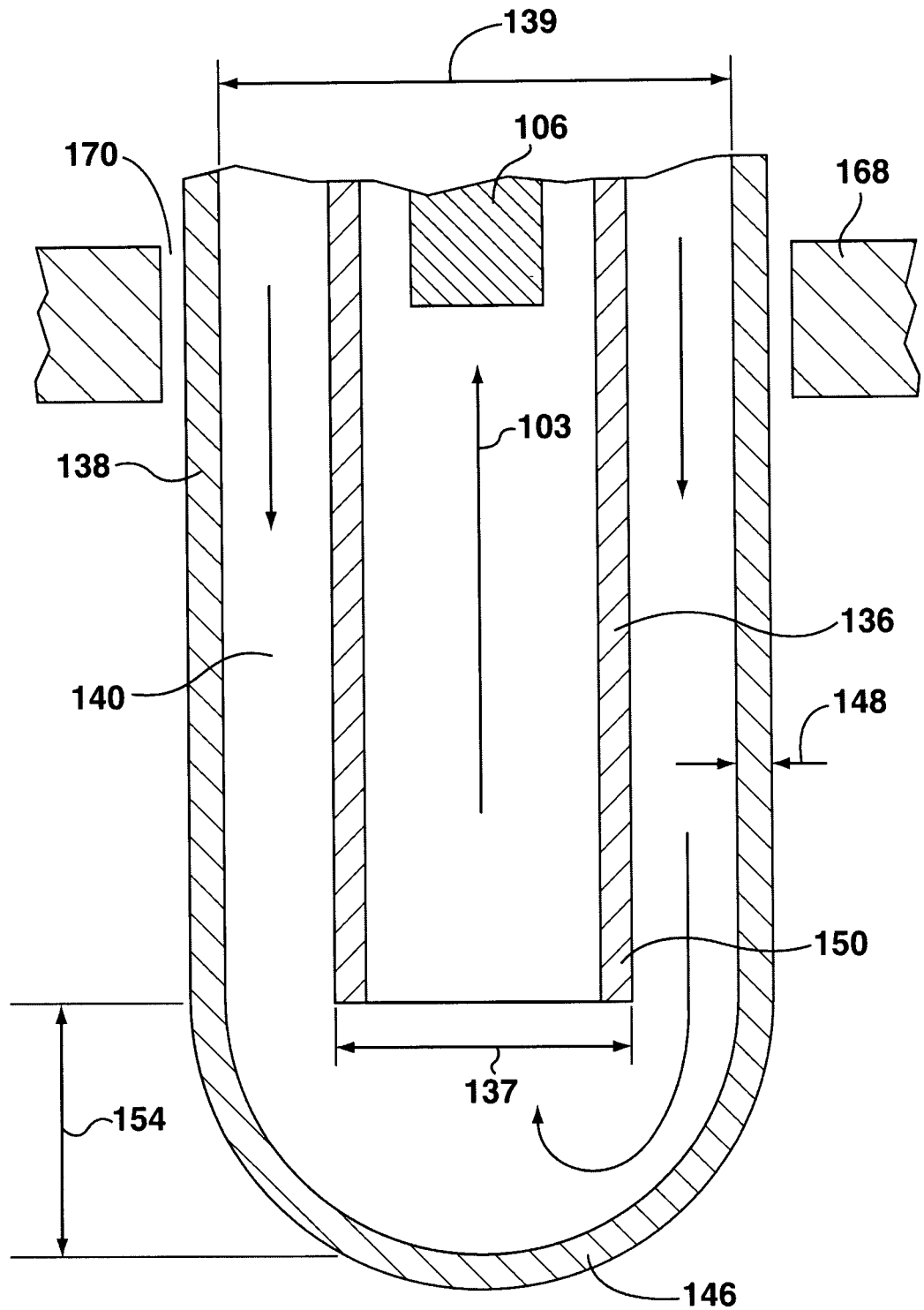
FIG. 2A is an enlarged view of section 2A indicated on FIG. 2.
Figure 3:
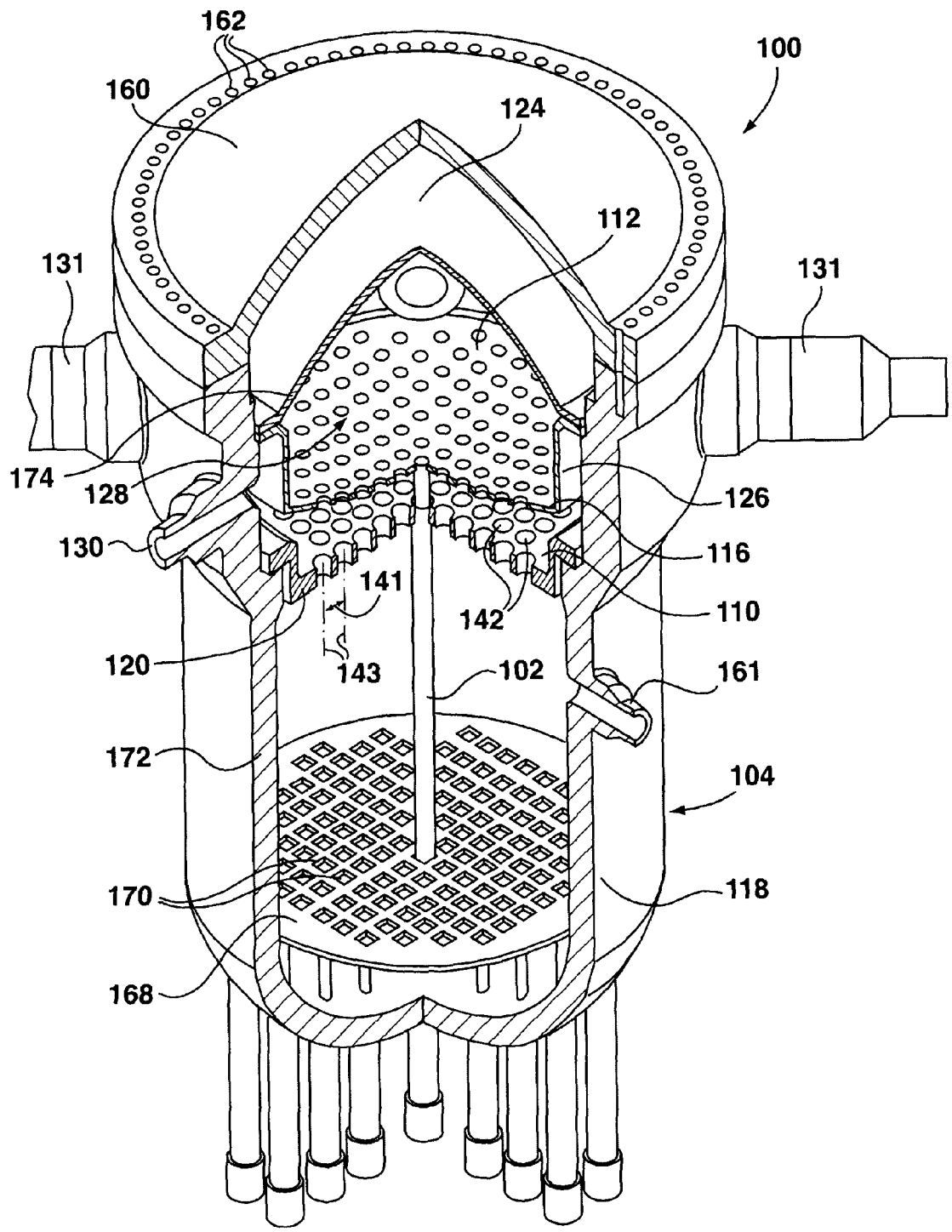
FIG. 3 is a partial sectional, isometric view of the reactor of FIG. 1.
Figure 4:
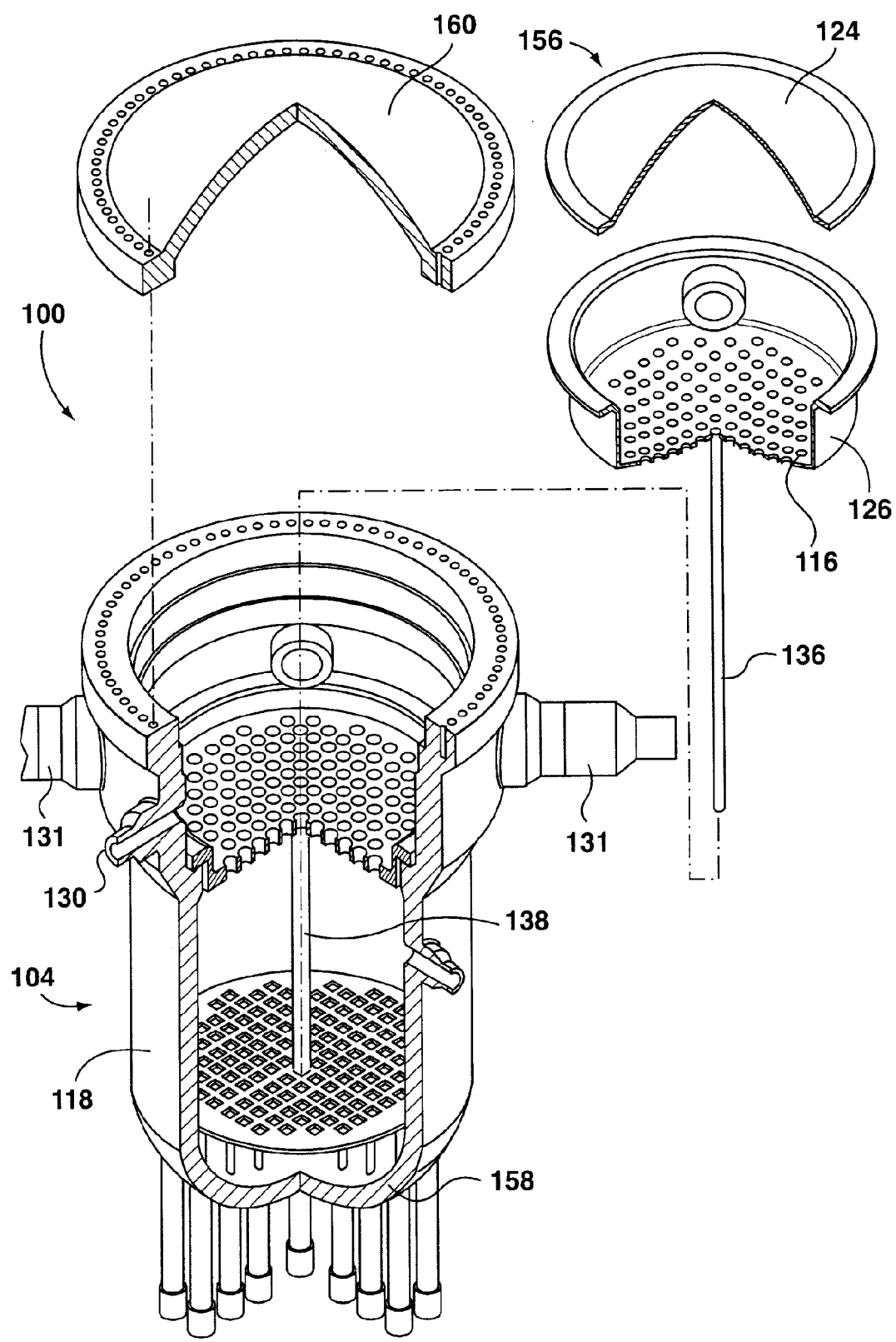
FIG. 4 is a partially exploded view of the reactor shown in FIG. 3.

Referring to FIGS. 1, 3 and 4, one example of a nuclear reactor 100 includes a plurality of pressurized fuel channels, for example fuel channels 102 contained within a pressurized containment vessel or pressure vessel, for example reactor pressure vessel 104, that contains a moderator fluid in the calandria 105a. For clarity, only a single fuel channel is illustrated, but it is understood that the pressure vessel may contain and will usually contain a plurality of fuel channels. Each fuel channel, 102 can be sized to accommodate a fuel liner tube 136, which further accommodates nuclear fuel rods or elements, shown schematically as fuel bundle/assembly 106 and can have an inner diameter, for example diameter 137 (FIG. 2A) between 2-25 cm, and in some examples between 5-15 cm. The fuel channels 102 can withstand the expecting operating temperatures and pressures of the nuclear reactor 100 (although they may be designed to yield during abnormal or emergency conditions), have suitable neutron absorption characteristics (as explained in more detail below) and include a fuel bundle holder or fuel holding apparatus (not shown) that is adapted to receive one or more fuel bundles 106.

The fuel assembly 106 can be any suitable nuclear fuel source, including, for example, a plurality of 50 cm long fuel bundles and/or a plurality of longer fuel bundles having a length between 3-6 m. The fuel assembly may include rods, pellets and any other fuel configuration.

In the present example, the reactor pressure vessel 104 is sub-divided into at least first and seconds portions or chambers, for example a first or lower portion or calandria 105a for containing the pressurized heavy water moderator, and a second or upper portion 105b that contains the coolant and is generally separated from the moderator. The upper portion 105b can define a plenum chamber for receiving and/or defining coolant plenums within the reactor pressure vessel 104 (for example plenums 110, 112).

It is understood that a flow of coolant fluid, in a primary coolant loop, is circulated through the fuel channels 102 so that it can be heated by the energy release by the nuclear reactions in the fuel bundles/assemblies 106 and then used to produce steam and/or coolant heated to its supercritical state which drives turbines (not shown) for electricity generation, and/or de-salination, and/or co-generation. The fuel channels can form part of a larger, coolant treatment system or coolant containment system as known in the art. In the present example, the moderator fluid is deuterium (which is also referred to as heavy water or $D_2O$) that is maintained at a first pressure within the pressure vessel. The coolant fluid can be heavy water or light water ($H_2O$) or any other suitable coolant fluid known in the art. The fuel channels 102 are sealed within the reactor 100 so that the coolant in the fuel channels 102 does not mix with the heavy water moderator contained in the reactor pressure vessel 104.

Conventional commercial pressure-tube type reactors can include a plurality of, horizontally oriented pressure tubes, each of which is connected to a separate coolant inlet pipe or feeder and a separate coolant outlet feeder. As known in the art, on-line refueling of some horizontal commercial pressure tube type reactors is often done using automated refueling robots. The spacing or pitch between adjacent, horizontal pressure tubes can be determined primarily by physics parameters but can also be influenced by the external piping requirements (for the inlet and outlet feeders) as well functional limitations of the refueling robots (i.e., enough clearance must be left between tubes to allow for the proper operation of the robots and for the passage of feeder pipes), which may determine minimum dimensions.

The heavy water moderator in conventional pressure-tube reactors is held at low pressure, i.e. less than 200 kPa. In such existing reactors, the calandria need not be a thick-walled pressure vessel because substantially all of the high-pressure aspects of the reactor are contained by the pressure-tubes and the rest of the coolant containment system.

In contrast, the reactor 100 is a pressure-tube type reactor but not all of the pressure load is carried by the pressure tubes under normal operating conditions, and the heavy water moderator is pressurized and contained within a suitable pressure vessel. Coolant flowing through the fuel channels remains isolated from, and does not directly mix with the moderator contained in the surrounding pressure vessel.

The provision of the moderator under pressure can reduce the pressure differential faced by the fuel channels by providing an intermediate pressure zone. In some examples, the moderator pressure can be substantially the same as the coolant pressure in the fuel channels. In other examples the moderator pressure can be different than the pressure of the coolant. Optionally, the moderator pressure can be between 20%-110% of the coolant pressure. For example, if the coolant pressure is between 20-30 MPa, the moderator pressure can be between 5-25 MPa, and optionally 25-30 MPa or greater than 30 MPa.

An advantage of reducing the pressure across the fuel channels (e.g. across the pressure tubes described below) may be that the pressure tubes can be made correspondingly thinner. This enables the pressure tubes to be optimized with respect to the reactor physics. Additionally, for a reactor intended to operated in a supercritical regime, that necessarily requires high pressures, it enables these high pressure to be present in the pressure tubes, without the pressure tubes requiring thick walls to safely withstand the internal pressure.

Figure 2:
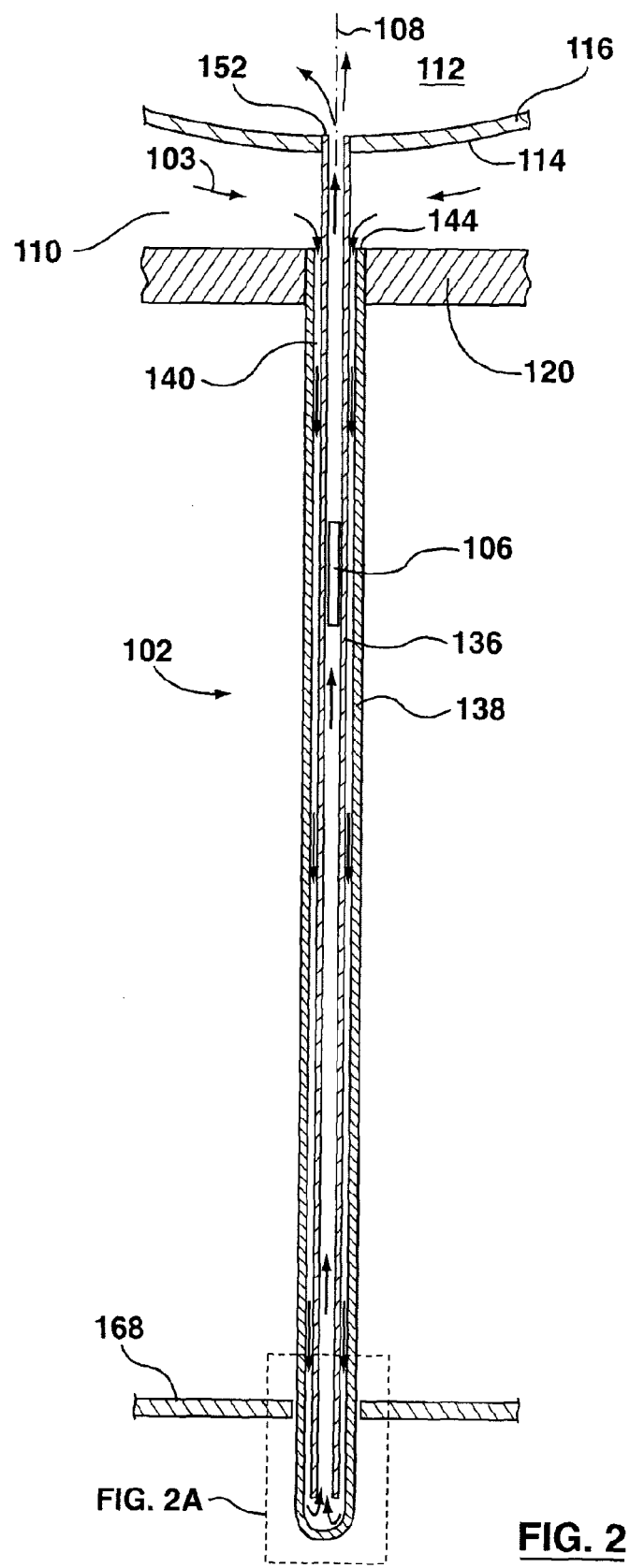
FIG. 2 is a sectional view of a fuel channel that can be used in the nuclear reactor of FIG. 1.

Optionally, the reactor 100 is vertically oriented, as illustrated, so that the fuel channels 102 are arranged in a substantially vertical configuration, preferably so that a fuel channel axis 108 defined by the longitudinal axis of any given fuel channel 102 is vertical (FIG. 2). In some examples, the fuel channels 102 can be reentrant fuel channels (as described below) so that coolant fluid can be supplied from the upper end of the reactor 100, at the inlet nozzle(s) 130, and withdrawn from the outlet nozzle(s) 131. In other examples, with different fuel channels the coolant fluid can be supplied and withdrawn from different areas or portions of the reactor 100.

Figure 6:
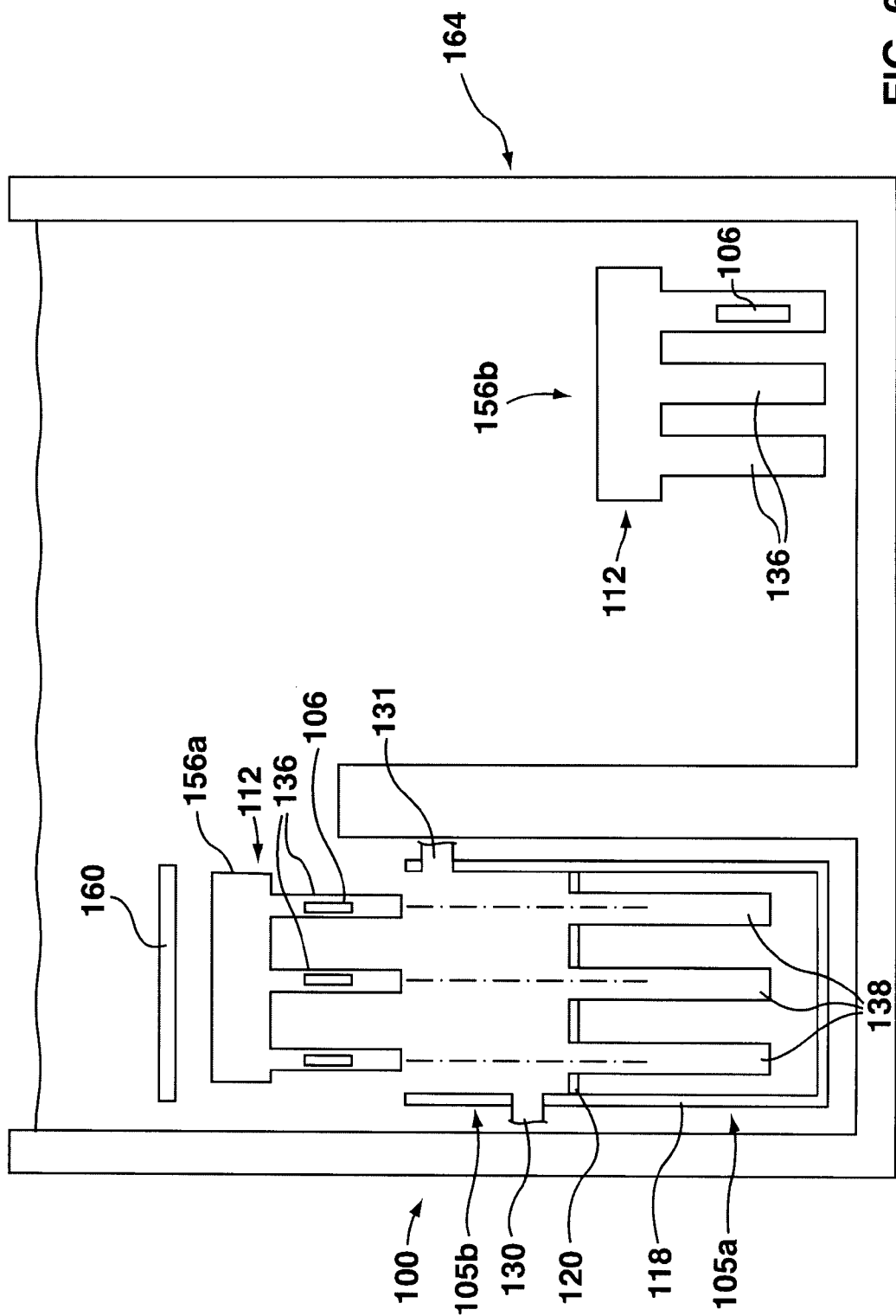
FIG. 6 is a schematic view of a reactor having two core modules.

In the described example, the plurality of inlet and outlet feeders required on existing pressure-tube type reactors are replaced with a coolant inlet plenum and a coolant outlet plenum. In this example, all of the fuel channels 102 in the reactor 100 are all supplied with coolant from a single inlet header or plenum, for example inlet plenum 110 that is connected to an inlet end of each fuel channel 102, and the coolant exiting each fuel channel 102 (having been heated by the fuel bundles/assemblies 106) is collected in a single outlet header or plenum, for example outlet plenum 112 that is connected to an outlet end of each fuel channel. The reactor 100 cannot be refueled on-line because it is not possible to selectively open or access a portion of the fuel channels 102 while leaving the remaining fuel channels 102 in operation. When the reactor 100 is taken off-line (i.e. shut down for maintenance or refueling) the reactor 100 can be opened to allow servicing and batch re-fueling, as described in detail below (FIGS. 4 and 6).

The inlet plenum 110 includes a first or upper wall portion that forms an upper boundary on the plenum. In the present example, the upper boundary of the inlet plenum is defined by a lower surface of the reactor pressure vessel head 160. The inlet plenum 110 also includes side walls and second or lower wall portion. In the present example the inlet plenum side walls are provided by portions of the pressure vessel 104, for example side walls 118, and the lower wall portion is provided by the upper surface of the fueling tubesheet 120. The external surface 114 of the outlet plenum 112 provides the inside surface of the inlet plenum 110. The outlet plenum external surface 114 separates the inlet plenum 110 from the outlet plenum 112. Together, the upper wall, side walls, insulated lower wall, and outlet plenum external surface cooperate to enclose an inlet plenum chamber 122 to receive coolant from a coolant supply source, for example, a coolant supply conduit connected to the coolant containment system (not shown), and distribute the coolant amongst the plurality of fuel channels 102. Coolant is introduced into the inlet plenum 110 via one or more coolant inlet ports, for example coolant nozzles 130, that extend through the reactor pressure vessel side wall 118. In other examples, the coolant inlets can be any suitable type of coupling, valve or connector known in the art. Optionally, the inlet plenum 110 can be supplied with coolant from one or more coolant nozzles 130 depending on the desired coolant flow rate and/or other factors known in the art. Once in the reactor 100, the coolant fluid follows a coolant flow path, schematically represent by a plurality of arrows 103

In the present example, the coolant enters the inlet plenum 110 as a low temperature subcritical fluid, at any suitable inlet temperature, for example an inlet temperature between 280-350 degrees Celsius, and any suitable inlet pressure, for example an inlet pressure between 15-30 MPa. Optionally the coolant inlet pressure can be between 10-25 MPa. The materials used to form the inlet plenum 110 can be any suitable material having the desired properties to withstand the expected coolant inlet conditions, including, for example zirconium or stainless steel alloys.

In the present example, the outlet plenum 112 includes a first or upper wall, for example plenum cover 124, side walls, for example plenum side walls 126, and a second or lower wall, for example plenum tubesheet 116, that cooperate to define an outlet plenum chamber 128. The outlet plenum chamber 128 is configured to receive the coolant exiting each of the fuel channels 102 and direct the coolant downstream for further processing, including, for example steam generation, and/or processing in a nuclear turbine generator (not shown). Coolant exiting the fuel channels 102 is collected in the outlet plenum chamber 128 and then withdrawn from the outlet plenum 112 and carried away for further processing (optionally including steam generation and/or processing in a nuclear turbine generator) via one or more coolant outlet conduits (not shown). In the present example, the coolant outlet plenum 112 is fluidly connected to the coolant outlet conduits through coolant outlet nozzles 131. The outlet plenum 112 can include any suitable number of outlet nozzles 131. In the present example, the reactor 100 includes four outlet nozzles 131 spaced equally about the circumference of the outlet plenum 112.

As illustrated, the outlet plenum side wall 126 is a single, annular or ring-like member that is integrally forged with the plenum tubesheet 116. In other examples, the side wall 126 can be formed from multiple panels or segments, and can be separate from, but sealed to, the plenum tubesheet 116. In the illustrated examples, the plenum side wall 126 includes four outlet nozzles 131, spaced equally around the perimeter of the plenum 112, for removing coolant from the chamber 128.

In other examples the reactor 100 can include a greater or fewer number of outlet nozzles 131, and the outlet nozzles 131 may be arranged in any desired configuration. Coolant outlet nozzles 131 can also extend across the reactor pressure vessel pressure boundary, i.e. through a portion of the reactor pressure vessel walls, for example through calandria side walls 118. Coolant outlet nozzles 131 can be fluidly connected to, or coupled with, any suitable coolant outlet conduits, for example pipes (not shown) to carry the coolant away from the reactor 100.

In some examples, the subcritical coolant exiting the fuel channels 102 remains a subcritical fluid after being heated by the fuel bundles/assemblies 106. In other examples, the coolant exiting the fuel channels 102 has been heated by the fuel bundles 106 to become a supercritical fluid, having an outlet temperature between 400-675 degrees Celsius and an outlet pressure between 23-35 MPa (which may be slightly different than the inlet pressure due to flow losses and other known effects). The materials used to construct the outlet plenum 112, outlet nozzles 131 and at least the portions of the fuel channels 102 exposed to the high temperature supercritical coolant can be selected to withstand the expected coolant conditions.

Figure 5:
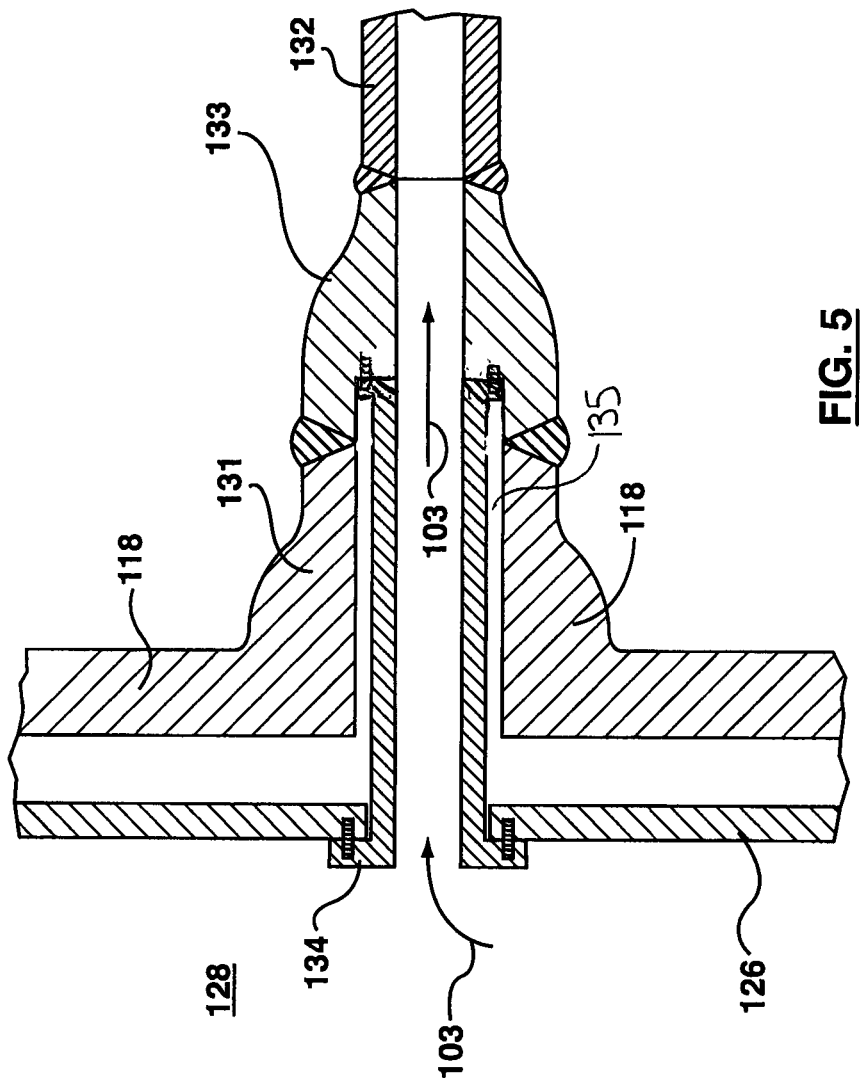
FIG. 5 is a sectional view of a connection of an outlet plenum used in the reactor of FIG. 1.

Exposure to flowing, high temperature supercritical fluids may cause accelerated corrosion and surface wear on some materials. Referring to FIG. 5, in some examples, consumable, replaceable wear elements, for example inserts or liners 134 can be inserted through the coolant outlets 131 in the outlet plenum 112 to overlie the inner surfaces of the outlet nozzles 131, and optionally portions of the downstream coolant pipes 132, to prevent the high temperature supercritical coolant exiting the plenum 112 from contacting and damaging the surfaces of the outlet nozzles 131 and pipes 132. In some instances it may be cheaper and/or simpler to replace a consumable liner 134 rather than having to refurbish or replace the outlet nozzles 131 or other portions of the high-pressure reactor pressure vessel 104. Liners 134 can be selectably withdrawn and removed to enable inspection and maintenance on the outlet nozzles 131 and to enable the outlet plenum 112 to be removed from the pressure vessel 104, as described in detail below. Optionally, the entire outlet plenum 112 can be designed as a consumable, replaceable element that is intended to wear in order to preserve the integrity of the surrounding pressure vessel. It some instances it may be cheaper and easier to provide multiple outlet plenums 112 in a nuclear power plant than to repair or replace damaged portions of the thick-walled pressure vessel 104.

The inserts 134 can be coupled to the outlet plenum 112, outlet nozzles 131 and pipes 132 using any suitable means, including bolts and welded joints. Referring to FIG. 5, in the illustrated example an adapter 133 is provided to connect the outlet nozzle 131 and liner 134 to the coolant pipe 132. In this example, the adapter 133 is welded to both the outlet nozzle 131 and the pipe 132, providing a coolant tight connection (to inhibit leaks) that is capable of withstanding a supercritical coolant pressure. The insert 134 extends through the outlet nozzle 131 and can be coupled to the outlet plenum side wall 126 and adapter 133 using any suitable means, including bolts and gaskets (as shown,) welded joints (not shown) or the insert 134 can be threaded into the adapter 133. The adapter 133 can be replaceable, so that the adapter 133 can be replaced without requiring the replacement of the outlet nozzle 131 or other portions of the pressure vessel 104.

The insert 134 can be sized so that an annular space 135 is formed between the liner 134 and the outlet nozzle 131. The annular space 135 can be in communication with the inlet plenum 110 so that relatively cooler coolant from the inlet plenum 110 can circulate between the insert 134 and the outlet nozzle 131, in the annular space 135, to regulate the temperature of the outlet nozzle 131.

In some examples it may be desirable to inhibit heat transfer between the incoming coolant fluid in the inlet plenum 110 and the already heated coolant fluid in the outlet plenum 112. In such instances, to control and/or inhibit heat transfer between the coolant held in the inlet plenum chamber 122 and the coolant held in the outlet plenum chamber 128 (and coolant in the portion of the fuel channels 102 that extends through the inlet plenum chamber 122 as described below), the surfaces separating the inlet and outlet plenum chambers 122, 128, for example plenum tubesheet 116 can include a thermally insulating material. In some examples a separate thermal insulator can be positioned between the inlet and outlet plenum chambers 122, 128. The thermal insulator can be any suitable material, including, for example ceramics and composite materials capable of withstanding high temperatures. In other examples, insulating material may be incorporated into the materials used to form the plenum tubesheet 116 and fuel channels 102. In some examples, insulating material can be incorporated within portions of the plenums 110, 112, instead of providing a separate insulator.

In some examples, the outlet plenum cover 124 can be a pressure bearing member that is capable of withstanding the entire differential pressure between the outlet plenum chamber 128 and inlet plenum chamber 122. In other examples, as illustrated, the reactor 100 can be configured so that the reactor pressure vessel 104 forms a majority of the pressure boundary between the interior of the reactor 100 and the surroundings.

In the illustrated example, the reactor pressure vessel 104 includes a generally cylindrical pressure bearing side wall 118 that is integrally formed with a curved or dome-like bottom wall 158. A dome-like pressure-bearing reactor pressure vessel head or cover 160 is detachably connected to the side wall 118 using any suitable means, including, for example, a plurality of bolts 162. The reactor pressure vessel head 160 and reactor pressure vessel (body) 104) are sealed by mechanical gaskets (not shown). In other examples, the pressure vessel can be any desirable and suitable shape known in the art. The bottom wall 158 and/or the cover 160 can be flat or have any other desired shape. The lower portion or calandria 105a, contains the moderator and is a distinct portion of the reactor pressure vessel 104. The calandria 105a, is a chamber bounded by the lower surface of the fueling tubesheet 120, the reactor pressure vessel side wall 118, and the reactor pressure vessel bottom wall 158. The calandria 105a, is penetrated by sealed pressure tubes 138. The fueling tubesheet 120, the side wall 118, the bottom wall 158 and pressure tubes 138, cooperate to enclose the calandria 105a volume, in which the heavy water moderator is stored. The heavy water moderator enters the calandria volume 105a, via inlet nozzle(s) 161 in the reactor pressure vessel side wall. The lower support plate 168, provides radial support of the pressure tubes 138.

Coolant inlet nozzles 130, coolant outlet nozzles 131 and heavy water moderator nozzles 161 (for supplying and/or removing heavy water to act as the moderator) can extend through portions of the side walls 118. The coolant fluid containment system and the moderator fluid containment system (for supplying the heavy water moderator) can include any suitable equipment known in the art, including for example pumps, storage tanks, accumulators, valves, heat exchangers and filters.

In the illustrated example, each fuel channel 102 is formed as a reentrant fuel channel and includes an inner conduit that is received within a surrounding outer conduit. The inner conduit is configured to retain the fuel bundles, and the conduits are nested so that coolant fluid can flow through both the inner and outer conduits.

Referring to FIG. 2A an example of a fuel channel 102 for use in the reactor 100 is shown. The fuel channel 102 includes an inner conduit, for example inner fuel liner 136, that is received within a corresponding outer conduit, for example outer pressure tube 138. In the present example both the fuel liner 136 and pressure tube 138 are generally cylindrical, tube-like members and the fuel liner 136 is concentrically aligned within the pressure tube 138 defining an annular space 140 there between. The size of the annular space 140 is based on the relative diameters 137, 139 of the fuel liner 136 and pressure tube 138 respectively. Optionally, the fuel liner 136 may not be concentrically positioned within the pressure tube 138, but may be offset. In such examples the annular space 140 may have a width that varies around the circumference of fuel channel 102.

Coolant flow rate through the fuel channel 102 can be based on the cross-sectional area of the annular space 140. The relative sizes of the fuel liner 136 and surrounding pressure tube 138 can be selected to provide an annular space 140 having a desired cross-sectional area.

In other examples, one or both of the fuel liner 136 and pressure tube 138 can be non-cylindrical, provided that the fuel liner 136 can be adequately received within the pressure tube 138. In some examples at least a portion of the walls of the fuel liner 136 can comprise a portion of the walls of the pressure tube 138 (i.e. a shared wall segment).

A first end of each pressure tube 138, for example an upper, inlet portion 144 of each pressure tube 138 is coupled to the fueling tubesheet 120 and the annular space 140 is in fluid communication with the inlet plenum chamber 122. In this example, the inlet portion 144 of the pressure tube 138 serves as the inlet for the corresponding fuel channel 102. Each pressure tube 138 can be connected to the fueling tubesheet 120 using any suitable connecting means known in the art, including rolled joints, welded joints, explosion bonding, etc. The connection mechanism can be selected based on the materials of the pressure tubes 138 and the fueling tubesheet 120.

Referring to FIG. 3, the number, configuration and arrangement or pitch spacing 141 of the apertures or openings 142 in the fueling tubesheet 120 (defined as generally horizontal the distance between aperture axes 143) can be any suitable distance and/or configuration known in the art to accommodate the desired number of pressure tubes 138 (and accordingly fuel channels 102) in a given reactor. The arrangement of the lattice spacing can be either rectangular/square or triangular/hexagonal in geometry. In some examples the fueling tubesheet 120 is formed from the same material as the pressure tubes 138. In other examples the fueling tubesheet 120 and pressure tubes 138 are different materials.

The lower portion 146 of the pressure tube 138 is sealed in a liquid-tight manner, so that the interior of the pressure tube 138 (into which the fuel liner 136 extends) is separated from the pressurized heavy water moderator surrounding the exterior of the pressure tube 138. In this configuration, any pressure differential between the coolant insider the fuel channels and the heavy water moderator in the calandria 105a is carried by the pressure tube 138.

While the described calandria 105a is a high-pressure vessel configured to contain pressurized heavy water, in some examples there may be a pressure difference between the coolant and the moderator. In some examples, the heavy water within the calandria 105a can be maintained at a first pressure, for example between 5-25 MPa, optionally 15 MPa, and the pressure of the coolant flowing within the pressure tubes 138 can be at a second pressure, for example between 20-35 MPa, optionally 25 MPa. In the described example, each pressure tube 138 is capable of withstanding the resulting differential pressure of at least 10 MPa. In other examples, heavy water in the calandria 105a can be maintained at the same pressure as the coolant flowing in the fuel channels 102. In such examples the pressure tube 138 need not be configured to withstand a substantial differential pressure. For any given reactor 100, the pressure tube 138 materials and wall thickness 148 can be selected based on the expected pressure differential present within the reactor 100.

Pressure control systems are provided for both the coolant circulating in the primary cooling loop and the moderator. Further, in some examples, any suitable pressure relief device (such as rupture disk, pressure relief system, and both active and passive systems) may be used to relieve abnormal pressure conditions. Rupture disks and the like have particular applicability to relieving pressure in accidental or abnormal situations. The pressure boundary between the moderator and primary coolant loop may be provided with rupture disks that vent the pressure tubes into the moderator, to cause rapid equalization in pressure between the primary cooling loop and the moderator; for supercritical operation, the quantity of fluid circulating in the primary cooling loop is not large, and it should be possible for some of its energy be absorbed when in direct contact with the cooler moderator, in an emergency situation, without causing the moderator pressure to rise excessively. Further the pressure control system for the moderator may then be configured to handle a sudden influx of additional fluid from such a pressure relief event, and/or the primary coolant system and moderator system be coupled through a pressure equalizing system that maintains coolant separation.

Referring to FIG. 3, in this configuration, the reactor 100 comprises two separate, pressurized systems, separated by respective pressure boundaries. In the illustrated example, a first pressurized system contains the moderator at its first pressure. This first pressurized system is defined by a first pressure boundary 172 that separates the moderator from the surrounding atmosphere and from the coolant flowing through the fuel channels 102. In the present example, the first pressure boundary 172 is defined by the reactor pressure vessel walls 118, 158, 160. In some examples the pressure in the calandria 105*a* of the reactor pressure vessel 104 can be different than the pressure in the upper portion 105*b*. In such examples, the first pressure boundary 172 may also include the fueling tubesheet 120.

The second pressurized system is contained within the first pressurized system and, in the current examples, is defined by a second pressure boundary 174 that is formed by the walls of the inlet and outlet plenums 110, 112 that contain the coolant fluid, including the fueling tubesheet 120, and the walls of the pressure tubes 138. In this configuration, the fueling tubesheet 120 and pressure tubes 138 cooperate to maintain a pressure difference between the moderator in the calandria 105*a* of the pressure vessel 104 and the coolant fluid within the inlet plenum 110, upper portion 105*b* and the fuel channels 102.

Both pressure boundaries are liquid-tight (except for intentional access points and conduits) so that neither coolant fluid nor heavy water can pass through the first or second pressure boundary (unless the reactor is opened as described herein). It is understood that there may be local pressure variations within each pressurized system. For example, coolant pressure at the fuel channel outlets may be slightly lower than the pressure at the fuel channel inlets due to pressure losses experienced by the coolant as it flows through the fuel channels.

Both the inlet portion and outlet portion of the fuel liner 136 are such that the fuel liner 136 forms a continuous fluid conduit for channeling coolant from the inlet downward through the outer channel annulus space 140, re-entering at the bottom of the fuel channel upward into the central fuel liner 136, past the fuel bundle/assembly 106, through outlet portion and into the outlet plenum chamber 128.

Referring to FIG. 2A, in the present example, the inlet portion of the fuel liner 136 is provided by spacing the open, lower end 150 of the fuel channel 102 apart from the sealed lower portion 146 of the pressure tube 138 by a predetermined distance 154. The magnitude of this distance 154 can influence the flow of the coolant through the fuel channel 102, and can be selected to provide the desired flow characteristics. In the present example, the distance 154 is chosen to optimize the coolant flow characteristics.

In other examples, the lower end 150 of the fuel liner 136 can be sealed and/or connected to the pressure tube 138, and the inlet portion of the fuel liner 136 can comprise one or more apertures formed in, and extending through the walls of the fuel liner 136 (not shown).

In any example, the lower portion 146 of the pressure tube 138 and the inlet portion of the fuel liner 136 can be of any suitable shape or configuration to provide the desired coolant flow conditions within the fuel liner 136, including, for example, laminar flow, turbulent flow, rotational or vortex type coolant flow around the fuel bundle/assembly 106. Additionally, the lower end 150, can have features (not shown) to control the flow in the channel (i.e. a nozzle).

The outlet portion of the fuel liner 136 is provided by the open, upper end 152 that is coupled to the outlet plenum tubesheet 116, so that coolant flowing out of the upper end 152 of the fuel liner 136 enters the outlet plenum chamber 128. The upper end 152 of the fuel liner 136 can be coupled to the plenum tubesheet 116 in any suitable manner, as explained above. In this example, the upper end 152 of the fuel liner 136 provides the outlet of the fuel channel 102.

In the present example, the fuel liners 136 are not directly coupled to the pressure tubes 138 so that the fuel liners 136 can be freely removed from the pressure tubes 138 when desired, and may be considered as consumable. In this configuration, the entire outlet plenum 112 is detachably connected to the reactor 100 (using any suitable method known in the art including bolts) so that the outlet plenum 112 and the fuel liners 136 coupled to the plenum tubesheet 116 can be separated from the rest of the reactor 100 (as described in detail below) as a single unit or sub-unit, for example as a core module 156, for example as shown in FIG. 4 and as illustrated schematically in FIG. 6. When the outlet plenum 112 and fuel liners 136 are removed the fueling tubesheet 120 and pressure tubes 138 can remain in place, thereby containing the pressurized heavy water moderator in the calandria 105*a* in the reactor pressure vessel 104. In such configurations, the pressure tubes 138 and fueling tubesheet 120 are sized to withstand the expected operating pressure differential and at a maximum the depressurized moderator or primary heat transport system differential state.

Referring to FIG. 6, in some instances, operators of the reactor 100 can have one or more extra or replacement core modules 156*b* that are compatible with the reactor 100. The ability to remove the outlet plenum 112 and fuel liners 136 (optionally containing the spent fuel bundles) as a single core module 156 enables batch refueling of the reactor 100, in which, optionally, a core module containing spent fuel bundles/assemblies 106, for example a used core module 156*a*, can be swapped with a replacement core module 156*b* that contains new fuel bundles/assemblies 106. Swapping complete core modules 156, as opposed to individually swapping the fuel bundles/assemblies 106 in each fuel liner 136, may speed up the refueling process and may reduce reactor downtime. When a core module 156 is removed from the reactor 100 it may be inspected, serviced, re-fueled, refurbished or disposed of, as necessary.

In the present example, one example of a batch-refueling process includes the steps of detaching used core module 156*a* from the pressure vessel (or any other portion of the reactor 100) to simultaneously extract the outlet plenum 112 and the plurality of fuel liners 136 from the reactor 100, thereby simultaneously extracting the plurality of fuel bundles retained within the fuel liners 136.

Once the used core module 156 has been extracted, a replacement core module 156*b* can be inserted into the reactor 100. That is, core modules 156*a*, 156*b* can be swapped or exchanged.

Optionally, a containment pool 164 can be provided to store replacement core modules 156*b* to be inserted into and coupled to the reactor 100 and optionally, to receive the used or spent core modules 156*a* extracted from the reactor 100. Coupling the second, replacement core module 156*b* to the reactor 100 includes the steps of aligning each of the plurality of fuel liners 136 with their corresponding pressure tubes 138 that remained attached to the reactor pressure vessel 104. Once properly aligned, the replacement core module 156b can be lowered to position the fuel liners 136 in their operating positions in which they are at least partially received in their corresponding pressure tubes 138. Once properly inserted, the replacement core module 156b can be coupled to the reactor pressure vessel 104 (or any other suitable member), the reactor pressure vessel head 160 can be re-attached to the side walls 118 and the reactor 100 can be restarted.

Another example of batch-refueling comprises the steps of opening the pressure vessel, by removing the cover 160, but leaving the core module 156 within the reactor 100. Instead of removing the core module 156, an operator can detach the outlet plenum cover 124 from the outlet plenum sidewalls 126 to provide access to the outlet plenum chamber 128 and the plurality of fuel liners 136. In this example, spent fuel bundles/assemblies 106 can be removed from the fuel holder apparatus (not shown) within each of the fuel liners 136 using an overhead crane or any other suitable apparatus known in the art. Optionally, the fuel bundles/assemblies 106 can be removed from some or all of the fuel liners 136 simultaneously. Once emptied, fuel liners 136 can be re-fuelled by inserting new fuel bundles/assemblies 106 into fuel holders of the existing fuel liners 136. In this example the core module 156 can be re-used. This enables a single core module 156 to be used for multiple reactor cycles (i.e. the period between start-up and shutdown during which the reactor 100 is used to generate power).

In some examples, a reactor 100 can be re-fueled using either or both of the methods described above.

In any of the examples described herein, the fuel channels 102, including both the fuel liners 136 and the pressure tubes 138, can be formed from any suitable material that has the desired mechanical properties and has sufficiently high neutron transmissibility to enable the desired nuclear fission reaction within reactor 100, as known in the art. In some examples, both the fuel liners 136 and the pressure tubes 138 are formed from zirconium alloys known in the art to be substantially transparent to neutrons generated during the nuclear reaction. In other examples, the pressure tubes 138 are formed from a zirconium alloy and the fuel liners 136 are formed from a stainless steel alloy to withstand exposure to coolant in a supercritical state.

Because the pressure tubes 138 are sized to withstand substantially all of the pressure differential between the coolant and the heavy water moderator, the pressure differential across the walls of the fuel liners 136 (for example caused by the different flow velocities and boundary layer effects experienced by the coolant in the annular space 140 and the coolant within the fuel liner 136) can be relatively small, for example less than 1 MPa, which can enable the fuel liners 136 to be relatively thin walled (compared to the pressure tubes 138). Providing thin walled fuel liners 136 enables the fuel liners 136 to be formed from the desired stainless steel alloy while still remaining sufficiently transparent to neutrons.

The pressure tubes 138, and/or the fuel liners 136, can be formed from any suitable material. The material selected can be chosen based on a plurality of factors, including, for example, optimization properties for neutron absorption, strength, corrosion resistance, creep resistance, fracture toughness and temperature resistance. Optionally, the pressure tubes 138, can be formed from a material that has a neutron absorption cross-section between 150-300 mb. In some instances, the fuel liners 136 can formed as thin walled tubes so that a desired neuron absorption (i.e. allowing the passage of a sufficient number of neurtons) can be maintained despite the fuel liners 136 being made of a material having a neutron absorption cross-section of 3-4 barns.

In addition to containing and routing coolant, some or all of the cover 160, plenum cover 124, side walls 126, plenum tubesheet 116 and the volume of coolant retained within the both the outlet plenum chamber 128 and inlet plenum chamber 122 can provide radiation shielding at the top of the reactor 100. In some examples, some of all of these elements can provide a sufficient or desired level of radiation shielding so that the reactor 100 does not require a separate upper shield member. In other examples, the reactor 100 can include a separate upper shield, for example a neutron shield as known in the art (not shown), to provide a desired or required level of radiation shielding toward the top of the reactor 100. The radiation end shield can be any radiation shield apparatus known in the art, including the neutron reflector that includes an outer shell filled with spherical steel balls. A separate shield, if desired, can be located in any suitable location as known in the art, including, for example, between the plenum cover 124 and the calandria cover 160 and above/surrounding the calandria cover 160. Optionally, radiation shielding can also be provided around the side walls 118 and bottom wall of 158 of the pressure vessel 104.

The fuel channels 102 are disposed in a vertical orientation, as in reactor 100, thermal expansion and radiation creep generally can result in an axial lengthening of the fuel liners 136 and/or pressure tubes 138. In this configuration, changes in fuel liner 136 and pressure tube 138 lengths will generally not generally affect the radial spacing, i.e. the size of the annular spacing, between the fuel liner 136 and pressure tube 138.

In some examples, the expansion, or growth, of the fuel channels 102 (i.e. fuel liner 136 and pressure tube 138) may not be consistent or uniform across the reactor 100. For example, local differences in operating temperature, radiation flux, fuel bundle condition, coolant and/or moderator pressure and other factors can lead to differential growth of the fuel channels 102. That is, some fuel liners 136 and pressure tubes 138 can grow or lengthen by a greater or lesser amount than other fuel liners 136 and pressure tubes 138 in the same reactor 100. To account for the thermal expansion and creep of the fuel liners 136 and pressure tubes 138 described above, the pressure tubes 138 may be freely mounted a lower plate 168 of the pressure vessel 104, so as to be able to move axially (vertically as shown) relative to the plate 168 while helping to maintain desired fuel channel spacing or pitch.

As shown, the plate 168 can have non-circular openings 170, e.g. square or rectangular openings, for the pressure tubes 138 to permit free movement of the pressure tubes 138, and to equalize pressure on either side of the lower plate 168. In other examples the openings 170 can be circular, triangular or any other suitable shape and can be sized to freely receive the pressure tubes 138 while still allowing a sufficient passage of heavy water to balance the pressures on either side of the plate 168.

In some examples, instead of a continuous plate that includes apertures 170, the lower support plate 168 can be a lattice of cross-members (flat members or circular rods) or any other suitable structure. The support plate 168 can also include apertures 170 (or gaps in a lattice construction) to receive other reactor components, including control rods and the like.

In some examples the coolant fluid supplied to the reactor 100 (i.e. pumped into inlet plenum 110 and circulated through pressure tubes 138) can be at generally the same temperature as the heavy water moderator contained in the reactor pressure vessel 104. In other examples, the incoming coolant fluid may be warmer or cooler than the heavy water moderator.

In some examples, the pressure tubes 138 can be provided with additional insulating material to reduce heat transfer between the coolant fluid in the pressure tubes 138 and the heavy water moderator contained in the lower portion 105*a*. Optionally an insulator, for example a ceramic insulating sleeve, can be provided to surround the inner or outer surfaces of the pressure tube 138 (not shown).

In the present examples, the interior of the inlet plenum 110, for example chambers 122, is configured as a continuous, open cavity. In the above examples, the coolant fluid will tend to divide amongst the fuel channel inlets, i.e. pressure tubes 138, because the pressure losses in the pressure tubes 138 are significantly higher than the pressure losses in the inlet plenum chamber 122. The coolant flow rate through each of the pressure tubes 138 is controlled by features (not shown) in the fuel liner bottom 150, that limit the flow as required to remove the appropriate amount of heat from each fuel channel. In some examples, the coolant flow rate through fuel channels 102 located toward the centre of the calandria 105*a* is higher than the coolant flow rate through fuel channels 102 located toward the periphery of the calandria 105*a*.

While the fuel channels 102, and both the inner and outer conduits therein, in the reactor 100 are described and illustrated as substantially cylindrical or pipe-like members, it is understood that the fuel channel conduits can be of any suitable, complimentary cross-sectional shape and configuration known in the art, including, for example, oval, arcuate, polygonal and rectangular cross-sectional shapes.

While not described in detail, it is understood that the reactor 100 can include any known reactivity mechanisms (both in and out of the reactor core), reactor control devices and reactor safety devices known in the art, for example as used with existing heavy water moderated pressure-tube type reactors such as CANDU® reactors. Such devices can include, for example, control rods, liquid neutron poisons, shut off rods, liquid zone controllers, etc.

It is understood that fail-safe control rods (not shown) are one example of a reactor shutdown system that is configured to rapidly and automatically terminate reactor operation. Control rods can introduce negative reactivity by absorbing excess neutrons when inserted between pressure tubes. In the example illustrated, the control rods are inserted from beneath the calandria 116, and can be inserted through the bottom wall.

Optionally, the control rods penetrate the calanria vessel 116 at an angle and operate on a fail-safe principle such that, in the event of an emergency reactor trip, the clutches that keep each control rod in its storage position are de-energized causing the control rods to be inserted or dropped into the calandria vessel 116 under the force of gravity. In some examples, the reactor 100 can be controlled by one or more various reactivity control devices including liquid zone controllers, adjuster rods and absorber rods.

One example of a liquid zone controller includes a plurality of fixed control rods with controllable light-water filled compartments. Optionally, the liquid zone controllers can be positioned horizontally, penetrating the calandria vessel 116 in a horizontal plane. By changing the level of $H_2O$ in individual compartments, reactivity of the core can be changed locally.

Optionally, adjuster rods (which are normally inserted fully in the core) can be partially moved out to change reactivity. The adjuster rods can extend horizontally.

Optionally the absorber rods can be similar to the fail-safe control rods, and can be used for fast power reduction. The absorber rods can be configured to be gravity fed, in the same manner described above, and hence, they can oriented at an angle from the vertical.

A liquid neutron poison can be inserted using an active or passive system or structure, during abnormal or accidental situations, or for a guaranteed shut down. It may be contained within a housing with a rupture disk or containment, within the calandria, configured to automatically rupture if an abnormal pressure condition is detected. It can also be configured to rupture if an abnormal pressure condition is detected in the primary cooling loop. The neutron poison may comprise gadolinium nitrate or boric acid or any other suitable neutron poison known to the art.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A nuclear reactor comprising:
   a) a pressure vessel for containing a pressurized moderator at a first pressure that is between about 5 MPa and about 25 MPa;
   b) a coolant inlet plenum disposed at one end of the pressure vessel and having at least one inlet port for receiving a coolant fluid, the coolant inlet plenum comprising an inlet plenum upper wall, an inlet plenum lower wall spaced apart from the inlet plenum upper wall in a first direction and an inlet plenum sidewall extending therebetween;
   c) a coolant outlet plenum disposed within the coolant inlet plenum, the coolant outlet plenum comprising an outlet plenum upper wall, an outlet plenum lower wall spaced apart from the outlet plenum upper wall and an outlet plenum sidewall extending therebetween, and wherein the outlet plenum lower wall is spaced between the inlet plenum lower wall and the outlet plenum upper wall in the first direction;
   d) a plurality of fuel channels for a coolant fluid at a second pressure and fluidly connected at inlet ends thereof to the coolant inlet plenum, the fuel channels adapted to receive nuclear fuel bundles and to be mounted within the pressure vessel and surrounded by the moderator, and outlet ends thereof being fluidly connected to the coolant outlet plenum to enable the coolant fluid to circulate from the coolant inlet plenum through the fuel channels to the coolant outlet plenum;
   e) the plurality of fuel channels maintaining separation between the coolant fluid circulating within the fuel channels and the moderator.

2. The nuclear reactor of claim 1, wherein the coolant inlet plenum is separated from the moderator by a fueling tubesheet and the inlet ends of the fuel channels are coupled to the fueling tubesheet, wherein the moderator is maintained at the first pressure and the coolant fluid is maintained at the second pressure higher than the first pressure, and wherein the fueling tubesheet and the fuel channels maintain the pressure difference between the first and second pressures.

3. The nuclear reactor as claimed in claim 2, wherein the pressure vessel comprises the inlet plenum upper wall and the inlet plenum side wall and the pressure vessel is adapted to withstand the first pressure, and the fueling tubesheet and the fuel channels are adapted to withstand the difference between the first and second pressures.

4. The nuclear reactor of claim 1, wherein each fuel channel is a reentrant fuel channel that comprises an inner conduit received within a corresponding outer conduit, wherein each outer conduit comprises the inlet end of the respective fuel channel, each inner conduit comprises the outlet end of the respective fuel channel to enable the coolant fluid to circulate through both the outer conduits and inner conduits, and wherein each inner conduit is sized to both retain a nuclear fuel bundle and to be received within the corresponding outer conduit spaced therefrom to enable the coolant fluid to flow between the inner conduit and the corresponding outer conduit.

5. The nuclear reactor of claim 4, wherein the plurality of inner conduits are removably received within the corresponding outer conduits.

6. The nuclear reactor of claim 5, wherein the inlet plenum upper wall comprises an openable inlet plenum cover and the coolant outlet plenum is detachably mounted within the coolant inlet plenum and is removable from the coolant inlet plenum when the inlet plenum cover is open, and removing the coolant outlet plenum causes each inner conduit to be removed from the corresponding outer conduits, the coolant outlet plenum and plurality of inner conduits defining a first core module.

7. The nuclear reactor of claim 6, further comprising at least a second coolant outlet plenum coupled to at least a second plurality of inner conduits defining at least a second core module, the at least a second core module being exchangeable with the first core module.

8. The nuclear reactor of claim 4, wherein each outer conduit has an open first end, comprising the fuel channel inlet end, connected to the coolant inlet plenum to receive the coolant fluid, and a sealed second end to channel coolant fluid from the outer conduit into an open first end of the corresponding-inner conduit.

9. The nuclear reactor of claim 1, wherein the pressure vessel comprises at least one vessel side wall and a vessel cover detachably connected to the at least one side wall, the vessel side wall and vessel cover cooperate to encase the coolant outlet plenum, the coolant outlet plenum being accessible when the vessel cover is detached from the vessel side wall.

10. The nuclear reactor of claim 9, wherein the outlet plenum upper wall further comprises a detachable outlet plenum cover to allow simultaneous access to an outlet plenum chamber and the respective outlet ends of the plurality of fuel channels.

11. The nuclear reactor of claim 1, wherein the second pressure is substantially the same as the first pressure.

12. The nuclear reactor of claim 1, wherein the second pressure is greater than the first pressure.

13. The nuclear reactor of claim 1, wherein the first pressure is between 20%-110% of the second pressure.

14. The nuclear reactor of claim 1, wherein the second pressure is between 20 and 30 MPa.

15. The nuclear reactor of claim 4, wherein each outer conduit has a neutron absorption cross-section between 150-300 mb.

16. The nuclear reactor of claim 4, wherein the plurality of inner conduits are formed from a different material than the plurality of outer conduits.

17. The nuclear reactor of claim 1, wherein the inlet ends of the plurality of fuel channels are adapted to withstand subcritical coolant fluid and the outlet ends of the plurality of fuel channels are adapted to withstand supercritical coolant fluid.

18. The nuclear reactor of claim 1, wherein the moderator is heavy water and the coolant fluid is at least one of heavy water, and light water and gas.

19. The nuclear reactor of claim 4, wherein each outer conduit can withstand a pressure difference between 1 and 25 MPa, and each inner conduit can only withstand a pressure difference of less than 5 MPa, during normal operating conditions.

20. The nuclear reactor of claim 10, wherein the outlet plenum cover is accessible when the vessel cover is detached from the vessel side wall and is covered by the vessel cover when the vessel cover is attached to the vessel side wall.

21. The nuclear reactor of claim 1, wherein the coolant inlet plenum comprises at least one outlet nozzle and the coolant outlet plenum comprises at least one coolant outlet port fluidly connected to the outlet nozzle by a connecting conduit that extends through the coolant inlet plenum whereby coolant fluid can be conveyed from the coolant outlet plenum to a downstream coolant conduit that is external to the pressure vessel.

22. The nuclear reactor of claim 21, wherein the connecting conduit comprises a replaceable liner that extends within the coolant outlet port and is in direct physical contact with the coolant fluid within the coolant inlet plenum.

23. The nuclear reactor of claim 1, wherein the outlet plenum sidewall is generally cylindrical and the inlet plenum sidewall is generally cylindrical and surrounds and is spaced apart from the outlet plenum sidewall.

24. The nuclear reactor of claim 1, wherein the coolant outlet plenum upper wall is spaced below the inlet plenum upper wall in the first direction.

* * * * *